United States Patent [19]
Tres

[11] Patent Number: 4,633,375
[45] Date of Patent: Dec. 30, 1986

[54] FLASHING LAMP CONSTRUCTION
[75] Inventor: Paul A. Tres, Toronto, Canada
[73] Assignee: Dominion Automotive Industries Inc., Toronto, Canada
[21] Appl. No.: 822,848
[22] Filed: Jan. 27, 1986
[30] Foreign Application Priority Data Oct. 4, 1985 [CA] Canada ................................. 492245

[51] Int. Cl.$^4$ .............................................. F21J 21/30
[52] U.S. Cl. ........................................ 362/35; 62/80; 62/236; 62/249; 62/311
[58] Field of Search .................... 362/35, 80, 236, 249, 362/311

[56] References Cited
U.S. PATENT DOCUMENTS

| | | | |
|---|---|---|---|
| 2,407,382 | 9/1946 | Powers | 362/35 X |
| 2,814,029 | 11/1957 | McRea | 362/311 X |
| 3,117,302 | 1/1964 | Cardarelli et al. | 362/35 X |
| 4,319,306 | 3/1982 | Stanuch | 362/80 X |
| 4,484,175 | 11/1984 | McCarthy | 362/35 X |

FOREIGN PATENT DOCUMENTS 400137  10/1933  United Kingdom .................. 362/35

Primary Examiner—Lloyd L. King
Attorney, Agent, or Firm—Sim & McBurney

[57] ABSTRACT

A flashing lamp for vehicles incorporates a base with an upstanding integral boss defining a worm gear. The base and the boss are of plastic or equivalent material. A frame is rotatable about the axis of the worm gear, the frame supporting at least one lamp. A motor is supported from the frame and directly rotates a worm which engages the worm gear. Brush and ring elements are provided to transmit electrical energy through the stationary base to the rotating frame and its electrical components.

6 Claims, 2 Drawing Figures

FLASHING LAMP CONSTRUCTION

This invention relates generally to flashing lamps of the kind utilized on ambulances, police cruisers, and other emergency vehicles. In flashing lamps of the kind in question, the "flash" is created by providing one or two lamps within a transparent housing, the lamps being mounted for continuous rotation about a central vertical axis. As the lamp beams sweep in a circle around the vehicle, it appears to an observer that the lamps are "flashing".

BACKGROUND OF THIS INVENTION

One conventional construction for such a lamp incorporates a base with a frame mounted above the base for rotation. A motor mounted to the frame is adapted to rotate therewith, the motor shaft being connected to a reducing gearbox which typically reduces a motor speed of about 2500 rpm to an output speed of about 45 rpm. The output from the gearbox drives a pinion gear which engages a larger stationary gear concentric with the axis about which the frame rotates.

An important disadvantage in the conventional construction just described relates to the relatively complex and expensive gearbox necessary to accomplish the 50:1 reduction required. The gearbox usually contains several gears in a gear train.

Conventional constructions also incorporate sliding ring contacts for transmitting electrical power to the motor and to the lamps mounted on the frame. As is well known, sliding contacts generate radio interference, and when flashing lamps of this kind are mounted on emergency vehicles that need to be in constant and reliable radio contact with a central dispatch or office, such radio interference can be not only annoying but dangerous.

GENERAL DESCRIPTION OF THIS INVENTION

In view of the foregoing problems with the conventional construction, it is object of an aspect of this invention to provide a less expensive and simpler construction for a flashing lamp. It is an object of another aspect of this invention to eliminate or substantially reduce radio interference caused by a flashing lamp.

More particularly, this invention provides a flashing lamp for vehicles, comprising:

a base adapted to be secured to an underlying support, the base having an upstanding integral boss defining a worm gear, the base and the boss being of electrically non-conductive material, a frame, at least one lamp supported on said frame, first means mounting said frame for rotation about the axis of said worm gear, a motor supported from said frame, a worm directly rotated by said motor and engaging said worm gear, and second means by which to provide electrical power to said motor and said at least one lamp.

GENERAL DESCRIPTION OF THE DRAWINGS

One embodiment of this invention is illustrated in the accompanying drawings, in which like numerals denote like parts throughout the several views, and in which:

FIG. 1 is a partly broken-away perspective view of a flashing lamp incorporating this invention; and FIG. 2 is a sectional view taken along the line 2—2 in FIG. 1.

DETAILED DESCRIPTION OF THE DRAWINGS

Figure 1:
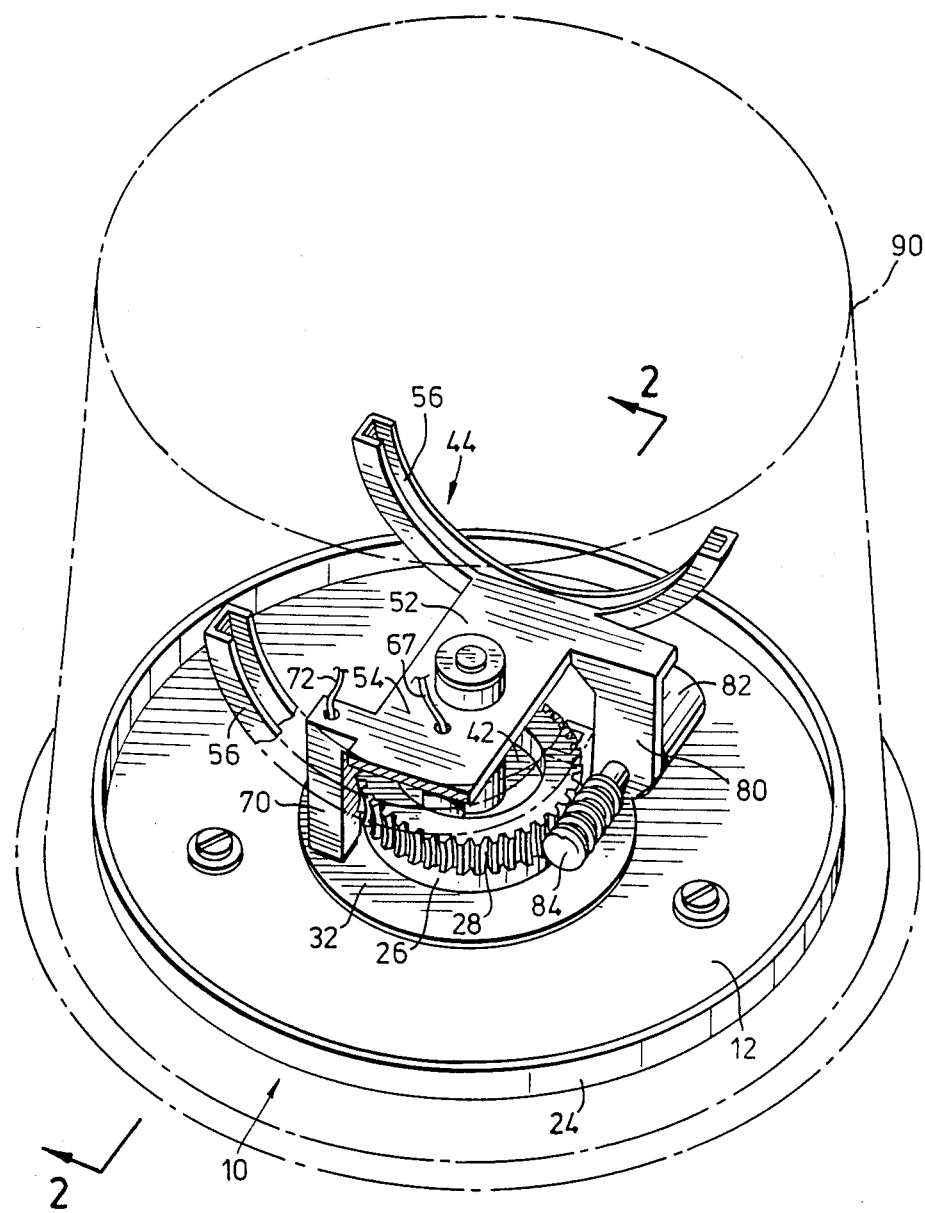

Attention is directed to the figures, which show a flashing lamp 10 which includes a base 12 adapted to be secured to an underlying support. Specifically, in the embodiment illustrated, the underlying support is a generally radially symmetrical dish-like member 14 having two peripheral steps, and having a lower edge 16 embedded in an elastomeric annular ring 18. The ring 18 is shaped to define a pointed bottom edge 20 which rests against the upper surface of a vehicle roof.

The base 12 has a flat bottom 22, and an annular upstanding rim 24. Integrally formed with the base 12 is a boss 26 which integrally defines a worm gear 28 on its upper outer edge. The base and boss are formed of an electrically non-conductive material, preferably plastic. As an example, a plastic known as Delrin 100, manufactured by DuPont, can be utilized. The boss 26 supports a central shaft 30 mounted coaxially with the worm gear 28.

Secured against the bottom 22 of the base 12 immediately surrounding the boss 26 is a flat annular ring 32 of electrically conductive material, preferably copper or a copper alloy.

The boss defines a internal annular cavity 34, and has a lateral passageway 35 to the outside. A wire 36 passes into the cavity 34 and along the passageway 35 to be connected to the ring 32.

The boss 26 further defines an upper annular cavity 40 in the base of which is a further flat annular ring 42, again of electrically conductive material such as copper or copper alloy.

Mounted for rotation about the axis of the shaft 30 is a frame 44, the frame 44 incorporating a central body 46. Through the body 46 is a central bore containing two bushing members 48 and 49, each having an outward annular flange at one end. The flange of the bushing 49 is lowermost, and rests against the boss 26. The flange of the bushing 48 is uppermost, and rides against a clip washing 50 adapted to fit into an annular groove at the upper end of the shaft 30, thus holding the body 46 in place on the shaft 30.

Figure 2:
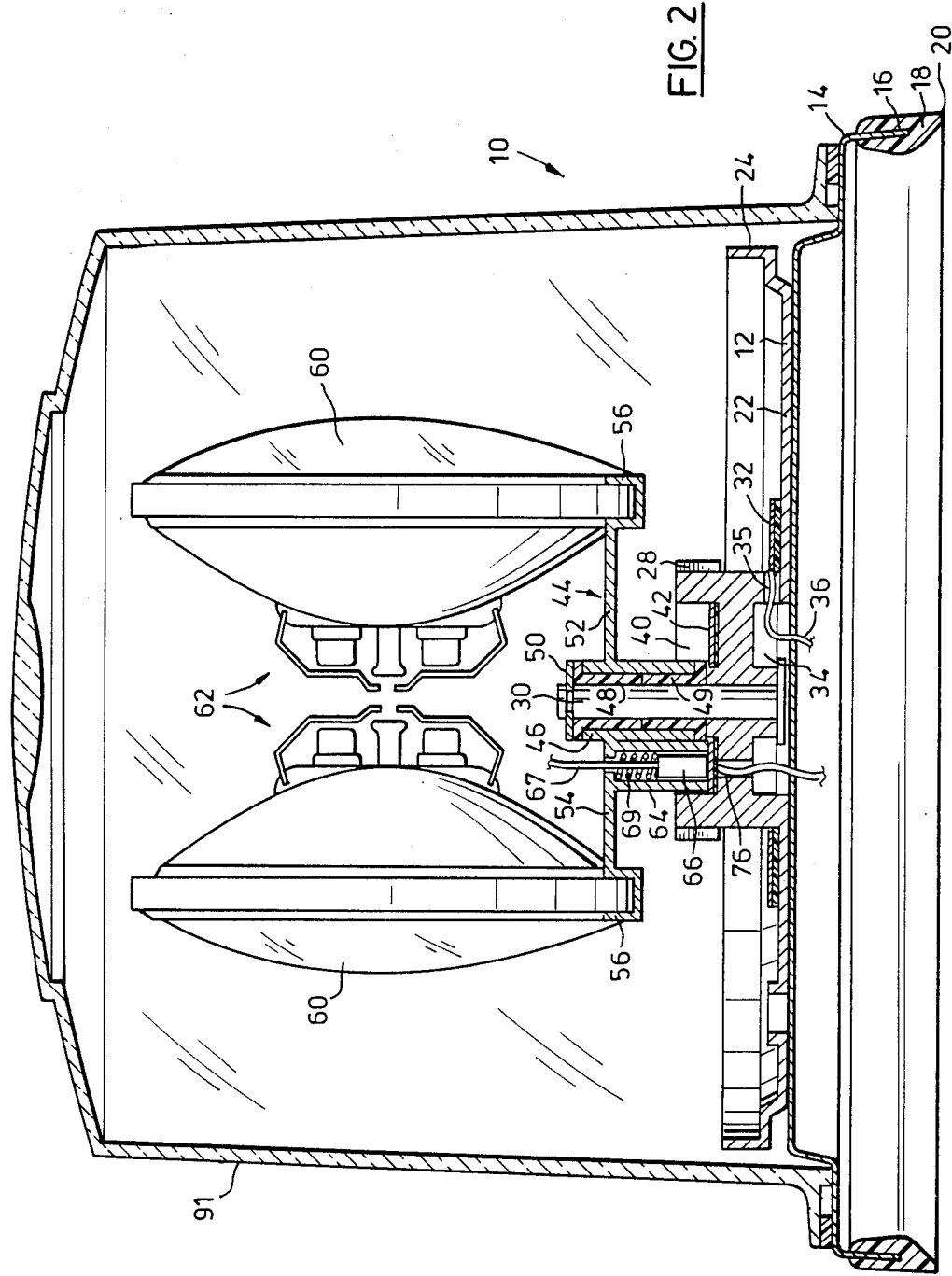

Extending laterally out from the body 46 are two arms 52 and 54, each arm supporting at its distal end an arcuate trough member 56, the shape of which can best be seen in the further trough member illustrated in FIG. 1. High intensity lamps of standard construction having annular rims are adapted to be fitted into the trough members 56, with ring-like elastomeric retaining members (not illustrated) holding the lamps in place by urging them downwardly into the trough members 56. The two lamps are illustrated in FIG. 2 at the numeral 60, and are aimed in opposite directions. The numeral 62 generally designates the electrical contact elements for the lamps. For simplicity, the wiring has not been illustrated. Typically, however, the two lamps would be wired in parallel.

Laterally adjacent the body 46 of the frame 44 is a guideway 64 secured to or integral with the body 46. The guideway 64 provides an internal vertical passageway along which a metal graphite brush 66 is adapted to reciprocate. The brush 66 is in electrical contact with the wire 67, and a compression coil spring 69 urges the brush 66 downwardly into contact with the ring 42.

A similar guideway not cut by the section of FIG. 2, but illustrated at 70 in FIG. 1, also contains an internal passageway in which a similar brush can reciprocate. Again a compression coil spring urges the brush downwardly, this time into contact with the ring 32. A wire 72 is in electrical communication with the brush inside the guideway 70.

Referring again to FIG. 2, the boss 26 has a vertical passageway 76, and a wire 77 extends through the cavity 34 and along the passageway 76 to its electrical connection with the ring 42. It can thus be seen that the wires 36 and 77 are constantly in electrical communication, respectively, with the wires 72 and 67 seen in FIG. 1. The latter two wires are electrically connected to the appropriate terminals for the lamps 60.

Extending rightwardly from the main portion of the frame 44, as seen in FIG. 1, is an arm 80 which supports a small electrical motor 82, the motor 82 turning a worm 84. The worm engages the worm gear 28. The motor 82 is connected in parallel with the lamp 60. Thus, whenever the wires 36 and 77 are energized, this results in the energization of both lamps 60 and the motor 82. The motor directly rotates the worm 84, i.e. without any intermediate gearing, and as a result the worm 84 and the entire frame 44 "walk" around the stationary boss 26. The speed at which the frame 44 rotates is a function of the number of worm gear teeth, and the speed at which the motor 82 rotates the worm 84.

The broken line 90 in FIG. 1 designates the general outline of a protective transparent cover for shielding the lamps and the frame from rain etc. The construction of the cover 90 forms no part of this invention, and can take any of several conventional forms. One such form is shown at 91 in FIG. 2.

In accordance with this invention, the inside surface of the base 12 is fully or at least partially coated with an aluminum foil layer, or equivalent metallized layer, in order to reflect away from the vehicle's radio apparatus any radio interference signals generated by the contact between the brushes and the rings.

The following materials are suitable for the manufacture of the various parts, but this list is not intended to be limiting in any way.

The shaft is preferably of steel, such as C-1010. The rings can be of copper or a copper alloy. The base 12 and boss 26 may be of Delrin 100, manufactured by DuPont. The worm gear is also manufactured of the same material. The worm 84 may be of Zytel 100, a plastic manufactured by DuPont. Both bushings 48 and 49 are preferably of Nylon 6. The frame 44 is preferably manufactured of Minlon reinforced with glass fibre, this plastic being manufactured by DuPont.

The brushes are preferably of metal graphite, and they are loaded by steel springs with sufficient force to make good contact with the rings.

As an alternative method of mounting for this flashing lamp, it would be possible to directly mount the base 12 to the upper surface, for example the roof, of a vehicle. This could be done either with direct contact between the base and the surface of the vehicle, or with a resilient cushion or pad between the base and the vehicle.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A flashing lamp for vehicles, comprising:
   a base adapted to be secured to an underlying support, the base having an upstanding integral boss defining a worm gear, the base and the boss being of electrically non-conductive material,
   a frame,
   at least one lamp supported on said frame,
   first means mounting said frame for rotation about the axis of said worm gear,
   a motor supported from said frame,
   a worm directly rotated by said motor and engaging said worm gear,
   and second means by which to provide electrical power to said motor and said at least one lamp.

2. The invention claimed in claim 1, in which there are two lamps pointing in opposed directions, and in which the base and the boss are of plastic.

3. The invention claimed in claim 2, in which said second means includes two conductive rings mounted on the base and two contacts resiliently biased against the rings.

4. The invention claimed in claim 3, in which the base is at least partly coated with a reflective metal layer to deflect away from the vehicle radio any interference generated by the contacts rubbing against the rings.

5. The invention claimed in claim 1, in which the first means includes a shaft mounted to the boss coaxially with the worm gear and bushing means around the shaft, the bushing means being supported in a bore of the frame.

6. The invention claimed in claim 4, in which the first means includes a shaft mounted to the boss coaxially with the worm gear and bushing means around the shaft, the bushing means being supported in a bore of the frame.

* * * * *